(12) United States Patent
Yan et al.

(10) Patent No.: US 11,359,807 B2
(45) Date of Patent: Jun. 14, 2022

(54) CONTROL METHOD FOR OPTIMIZING GENERATED POWER OF SOLAR-AIDED COAL-FIRED POWER SYSTEM UNDER OFF-DESIGN WORKING CONDITIONS

(71) Applicant: XI'AN JIAOTONG UNIVERSITY, Shaanxi (CN)

(72) Inventors: Hui Yan, Shaanxi (CN); Daotong Chong, Shaanxi (CN); Xin Li, Shaanxi (CN); Ming Liu, Shaanxi (CN); Junjie Yan, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/598,902

(22) PCT Filed: Jan. 25, 2021

(86) PCT No.: PCT/CN2021/073592
§ 371 (c)(1),
(2) Date: Sep. 28, 2021

(87) PCT Pub. No.: WO2021/164497
PCT Pub. Date: Aug. 26, 2021

(65) Prior Publication Data
US 2022/0090779 A1    Mar. 24, 2022

(30) Foreign Application Priority Data
Feb. 19, 2020  (CN) .......................... 202010102027.7

(51) Int. Cl.
*F22D 5/26*    (2006.01)
*F24S 50/00*   (2018.01)
(Continued)

(52) U.S. Cl.
CPC ................ *F22D 5/26* (2013.01); *F22B 1/006* (2013.01); *F24S 20/40* (2018.05); *F24S 50/00* (2018.05)

(58) Field of Classification Search
None
See application file for complete search history.

(56) References Cited

U.S. PATENT DOCUMENTS

2008/0127647 A1*  6/2008  Leitner .................. F24S 20/20
                                                                126/634
2011/0126824 A1*  6/2011  Conlon .................. F22B 35/16
                                                                126/569
(Continued)

FOREIGN PATENT DOCUMENTS

CN            103216402 A      7/2013

*Primary Examiner* — Avinash A Savani
*Assistant Examiner* — Deepak A Deean

(57) ABSTRACT

A control method for optimizing generated power of a solar-aided coal-fired power system under off-design working conditions sets maximizing generated power without changing main steam flow rate as a control goal. A solar-coal feedwater flow distribution ratio is adjusted to adjust water flow rate heated by a solar heat collection system, so as to achieve the control goal. Control steps include reading relevant information; calculating the water flow rate range heated by the solar heat collection system, and an applicable solar-coal feedwater flow distribution ratio range; establishing a correspondence between the generated power and the solar-coal feedwater flow distribution ratio within this range; selecting a solar-coal feedwater flow distribution ratio corresponding to the maximum generated power; and adjusting the water flow rate entering the solar heat collection system to an optimized value. The present invention can flexibly control the solar-coal coupling and improve the economy.

3 Claims, 3 Drawing Sheets

(51) Int. Cl.
    F24S 20/40        (2018.01)
    F22B 1/00         (2006.01)

(56) References Cited

U.S. PATENT DOCUMENTS

2012/0274069 A1* 11/2012 Venetos ................ F03G 6/067
                                                      126/714
2019/0113417 A1*  4/2019 Lyu ..................... G01N 25/005

* cited by examiner

CONTROL METHOD FOR OPTIMIZING GENERATED POWER OF SOLAR-AIDED COAL-FIRED POWER SYSTEM UNDER OFF-DESIGN WORKING CONDITIONS

BACKGROUND OF THE PRESENT INVENTION

Field of Invention

The present invention relates to the field of operation control of multi-energy complementary power generation systems, and more particularly to a control method for optimizing generated power of a solar-aided coal-fired power system under off-design working conditions.

Description of Related Arts

The power system structure of China has been dominated by coal-fired power generation for a long time, bringing increasingly serious problems of environmental pollution and resource shortages. Therefore, traditional coal-fired power generation is facing severe challenges. Using renewable energy has received widespread attention. Solar energy, as one of the primary development directions of the renewable energy, has received more and more attention. However, the intermittency of solar energy is serious, and the flexibility of the power grid of China is insufficient, which may cause difficulties in consumption of the solar power generation. On one hand, complementing solar energy with coal-fired power generation can take advantage of the large adjustment range of coal-fired power plants to compensate for the instability and intermittency of the solar energy, and save the cost of the stand-along concentrated solar power generation. On the other hand, the coal consumption can be reduced in coal-fired power plants, so as to save energy and reduce emissions. However, most of the existing solar-aided coal-fired power systems are difficult to control. Most of the control methods do not consider how to operate efficiently and flexibly under the conditions of solar irradiance fluctuations, nor smoothly absorb renewable energy, and the operation is complicated. At the same time, the conventional technology is difficult to ensure efficient and flexible operation of the solar-aided coal-fired power system under the conditions of changing power load requirements.

SUMMARY OF THE PRESENT INVENTION

To solve the existing problems in prior art, an object of the present invention is to provide a control method for optimizing generated power of a solar-aided coal-fired power system under off-design working conditions. An optimal control goal, which is maximizing power generation to improve economy and flexibility of the solar-aided coal-fired power system under the off-design working conditions, can be realized by establishing a corresponding relationship between a solar-coal feedwater flow distribution ratio and a total generated power under the off-design working conditions of the solar-aided coal-fired power system without changing a main steam flow rate, adjusting the solar-coal feedwater flow distribution ratio, and controlling a water flow rate heated in a solar heat collection system.

Accordingly, in order to accomplish the above objects, the present invention provides:

a control method for optimizing generated power of a solar-aided coal-fired power system under off-design working conditions, comprising steps of: setting maximizing the generated power as an optimal control goal; and maximizing the generated power referring that under conditions of keeping a main steam flow rate, a main steam temperature and a reheat steam temperature of a steam turbine of the solar-aided coal-fired power system unchanged, adjusting a solar-coal feedwater flow distribution ratio of a solar-coal complementary loop to adjust a water flow rate heated in a solar heat collection system, thereby maximizing an output power of the steam turbine;

wherein the generated power is obtained by using a formula (1) to calculate a specific enthalpy of water heated by the solar heat collection system and heated by a high-pressure heater after being mixed, and then by using formula (2) and combining a calculation method for a thermal system under off-design conditions to calculate the generated power;

$$h_{w(i-1),in} = \alpha_{TCS} \times h_{s,out} + (1-\alpha_{TCS})h_{wi,out} \quad (1)$$

wherein $h_{w(i-1),in}$ is the specific enthalpy of the water heated by the solar heat collection system and heated by the high-pressure heater after being mixed, i=1, 2, ... n, kJ/kg; n is a total number of regenerative heaters in the solar-aided coal-fired power system, and the regenerative heaters are numbered from 1 to n in an order of high pressure to low pressure; $\alpha_{TCS}$ is the solar-coal feedwater flow distribution ratio; $h_{s,out}$ is a specific enthalpy of the water heated by the solar heat collection system, kJ/kg; $h_{wi,out}$ is a specific enthalpy of the water heated by the high-pressure heater, kJ/kg;

$$W_{SCPP} = D_0 h_0 + D_{zr} h_{zr} - \sum_{i=1}^{n} D_i h_{wi,in} - D_c h_c - D_{sg1} h_{sg1} - D_{sg2} h_{sg2} \quad (2)$$

wherein $D_0$ is the main steam flow rate of the solar-aided coal-fired power system, kg/s; $h_0$ is a specific enthalpy of main steam of the solar-aided coal-fired power system, kJ/kg; $D_{zr}$ is a reheat steam flow rate of the solar-aided coal-fired power system, kg/s; $h_{zr}$ is a specific enthalpy of reheat steam of the solar-aided coal-fired power system, kJ/kg; $D_i$ is an i-th stage extraction steam flow rate of the steam turbine of a coal-fired power generation system in the solar-aided coal-fired power system, kg/s; $h_{wi,in}$ is a specific enthalpy of an i-th stage extraction steam of the steam turbine of the coal-fired power generation system in the solar-aided coal-fired power system, kJ/kg; $D_c$ is an exhaust steam flow rate of the solar-aided coal-fired power system, kg/s; $h_c$ is a specific enthalpy of exhaust steam of the solar-aided coal-fired power system, kJ/kg; $D_{sg1}$ and $D_{sg2}$ are a front shaft seal steam flow rate and a rear shaft seal steam flow rate of the coal-fired power generation system in the solar-aided coal-fired power system, kg/s; $k_{sg1}$ and $h_{sg2}$ are specific enthalpies of front shaft seal steam and rear shaft seal steam of the coal-fired power generation system in the solar-aided coal-fired power system, kJ/kg;

the control method for optimizing the generated power comprises specific steps of:

Step 1: obtaining operating conditions required by the solar-aided coal-fired power system, and obtaining relevant information of the solar heat collection system connected in parallel with high-pressure heaters, the coal-fired power generation system, and environmental conditions;

Step 2: determining a water flow rate range heated by a solar heat collection unit according to a heat transfer oil working temperature range and an equipment safely working range of the solar heat collection unit; and then, according to a ratio of the water flow rate range to a feedwater flow rate of the coal-fired power generation system, determining a solar-coal feedwater flow distribution ratio range applicable by the solar-aided coal-fired power system;

Step 3: under a condition of the set power load and a condition which keeps the main steam flow rate, the main steam temperature and the reheat steam temperature of the steam turbine of the solar-aided coal-fired power system unchanged, within the solar-coal feedwater flow distribution ratio range calculated in the Step 2, establishing a correspondence between the generated power and the solar-coal feedwater flow distribution ratio of the solar-aided coal-fired power system under current solar irradiance condition and the power load;

Step 4: selecting a solar-coal feedwater flow distribution ratio corresponding to a maximum generated power under the required operating conditions according to the correspondence obtained in the Step 3, wherein a design solar irradiance is an average direct normal solar irradiance in a typical meteorological year at the operating location of the solar-aided coal-fired power system; when operating at 80% to 100% power load, controlling the solar-coal feedwater flow distribution ratio at a lower limit; when operating at 60% to 80% power load, and when the direct normal solar irradiance is greater than 78%-95% of the design solar irradiance, controlling the solar-coal feedwater flow distribution ratio between 0.4 and 0.7 to obtain a maximum value of the generated power, and when the solar direct normal irradiance is lower than 78%-95% of the design solar irradiance, controlling the solar-coal feedwater flow distribution ratio between the lower limit and 0.6 to obtain the maximum value of the generated power; when operating at 40% to 60% power load, and when the direct normal solar irradiance is greater than 94%-102% of the design solar irradiance, controlling the solar-coal feedwater flow distribution ratio at an upper limit to obtain the maximum value of the generated power, and when the direct normal solar irradiance is between 47%-63% and 94%-102% of the design solar irradiance, controlling the solar-coal feedwater flow distribution ratio between 0.4 and 0.7 to obtain the maximum value of the generated power, and when the direct normal solar irradiance is lower than 47%-63% of the design solar irradiance, controlling the solar-coal feedwater flow distribution ratio between 0.25 and 0.3 to obtain the maximum value of the generated power, wherein the generated power is close to the maximum value when the solar-coal feedwater flow distribution ratio is controlled between 0.3 and 0.8; and Step 5: according to an optimized solar-coal feedwater flow distribution ratio obtained in the Step 4, calculating an optimized value $D^*_{wTCS}$ of the water flow rate heated by the solar heat collection system with a formula (3), and adjusting the water flow rate heated by the solar heat collection system to the optimized value;

$$D^*_{wTCS} = \alpha^*_{TCS} \cdot D_w \quad (3)$$

wherein $D^*_{wTCS}$ is the optimized value of the water flow rate entering the solar heat collection system for heating, kg/s; $\alpha^*_{TCS}$ is the optimized solar-coal feedwater flow distribution ratio; $D_w$ is a feedwater flow under current working conditions, kg/s;

when the operating conditions of the solar-aided coal-fired power system or solar irradiance changes, repeating Steps 1 to 5 again to reach the control goal.

Preferably, in the Step 1, the relevant information of the environmental conditions comprises a current solar irradiance and an ambient temperature; the relevant information of the solar heat collection system comprises information of the solar heat collection unit and a mirror field; the relevant information of the coal-fired power generation system is information required for generated power calculation, comprising main steam parameters, steam turbine extraction parameters, and operation information of the high-pressure heaters and low-pressure heaters.

Preferably, the solar heat collection system of the solar-aided coal-fired power system is also connected in parallel with a second-stage high-pressure heater and a third-stage high-pressure heater.

Compared with the prior art, the present invention has the following advantages:

(1) The present invention is suitable for optimizing the generated power of the solar-aided coal-fired power system under the off-design working conditions. Without changing the main steam flow rate and the temperature, the generated power is maximized by only controlling the feedwater flow rate entering the solar heat collection system. The control method is conducive to increasing power supply of the solar-aided coal-fired power system without changing the main steam flow rate, which improves economy and flexibility of the solar-aided coal-fired power system, and also benefits the use of solar energy.

(2) The control method of the present invention is simple to operate, easy to implement, low in investment, and short in recovery period.

DETAILED DESCRIPTION OF THE PREFERRED EMBODIMENT

The present invention will be further described below in conjunction with the drawings and embodiment.

Figure 1:
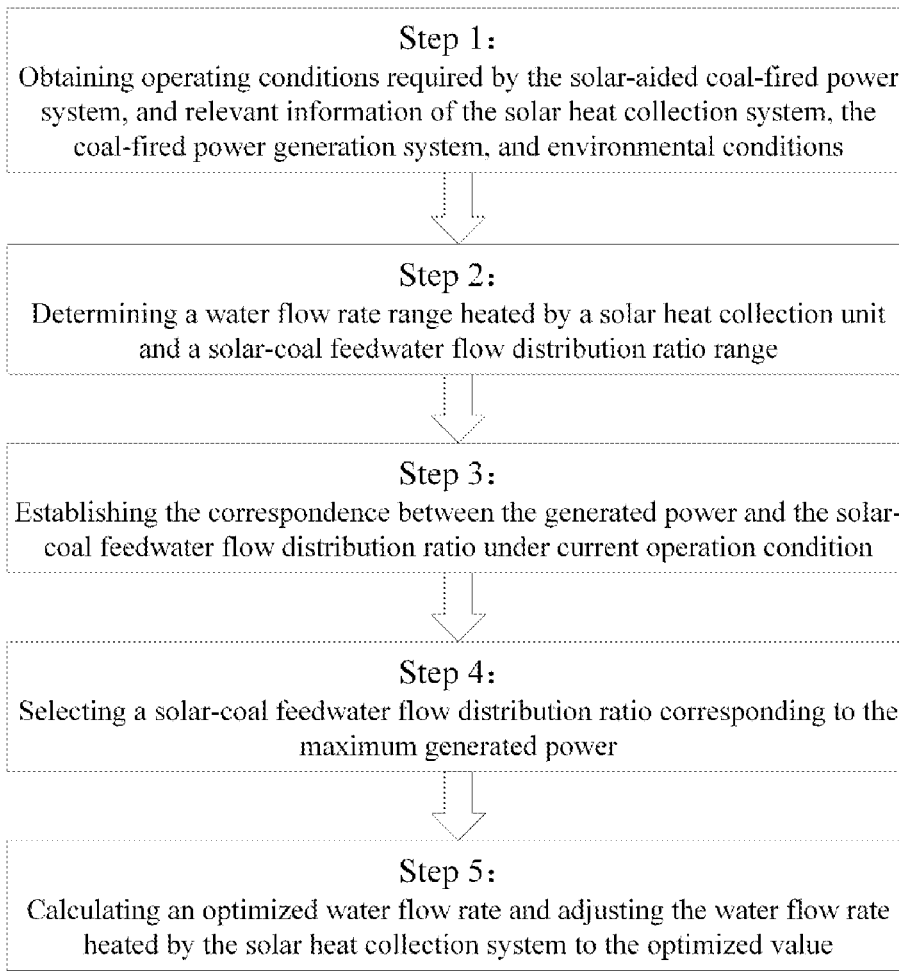
FIG. 1 is a flow chart of a control method for optimizing generated power of a solar-aided coal-fired power system under off-design working conditions according to the present invention.

Referring to FIG. 1, the present invention provides a control method for optimizing generated power of a solar-aided coal-fired power system under off-design working conditions, comprising steps of: setting maximizing the generated power as an optimal control goal; and maximizing the generated power referring that under conditions of keeping a main steam flow rate, a main steam temperature and a reheat steam temperature of a steam turbine of the solar-aided coal-fired power system unchanged, adjusting a solar-coal feedwater flow distribution ratio of a solar-coal complementary loop to adjust a water flow rate heated in a solar heat collection system, thereby maximizing an output power of the steam turbine;

wherein the generated power is obtained by using a formula (1) to calculate a specific enthalpy of water heated by the solar heat collection system and heated by a high-pressure heater after being mixed, and then by using formula (2) and combining a calculation method for a thermal system under off-design conditions to calculate the generated power;

$$h_{w(i-1),in} = \alpha_{TCS} \times h_{s,out} + (1-\alpha_{TCS})h_{wi,out} \tag{1}$$

wherein $h_{w(i-1),in}$ is the specific enthalpy of the water heated by the solar heat collection system and heated by the high-pressure heater after being mixed, i=1, 2, ..., n, kJ/kg; n is a total number of regenerative heaters in the solar-aided coal-fired power system, and the regenerative heaters are numbered from 1 to n in an order of high pressure to low pressure; $\alpha_{TCS}$ is the solar-coal feedwater flow distribution ratio; $h_{s,out}$ is a specific enthalpy of the water heated by the solar heat collection system, kJ/kg; $h_{wi,out}$ is a specific enthalpy of the water heated by the high-pressure heater, kJ/kg;

$$W_{SCPP} = D_0 h_0 + D_{zr} h_{zr} - \sum_{i=1}^{n} D_i h_{wi,in} - D_c h_c - D_{sg1} h_{sg1} - D_{sg2} h_{sg2} \tag{2}$$

wherein $D_0$ is the main steam flow rate of the solar-aided coal-fired power system, kg/s; $h_0$ is a specific enthalpy of main steam of the solar-aided coal-fired power system, kJ/kg; $D_{zr}$ is a reheat steam flow rate of the solar-aided coal-fired power system, kg/s; $h_{zr}$ is a specific enthalpy of reheat steam of the solar-aided coal-fired power system, kJ/kg; $D_i$ is an i-th stage extraction steam flow rate of the steam turbine of a coal-fired power generation system in the solar-aided coal-fired power system, kg/s; $h_{wi,in}$ is a specific enthalpy of an i-th stage extraction steam of the steam turbine of the coal-fired power generation system in the solar-aided coal-fired power system, kJ/kg; $D_c$ is an exhaust steam flow rate of the solar-aided coal-fired power system, kg/s; $h_c$ is a specific enthalpy of exhaust steam of the solar-aided coal-fired power system, kJ/kg; $D_{sg1}$ and $D_{sg2}$ are a front shaft seal steam flow rate and a rear shaft seal steam flow rate of the coal-fired power generation system in the solar-aided coal-fired power system, kg/s; $h_{sg1}$ and $h_{sg2}$ are specific enthalpies of front shaft seal steam and rear shaft seal steam of the coal-fired power generation system in the solar-aided coal-fired power system, kJ/kg; the control method for optimizing the generated power comprises specific steps of:

Step 1: obtaining operating conditions required by the solar-aided coal-fired power system, and obtaining relevant information of the solar heat collection system connected in parallel with high-pressure heaters, the coal-fired power generation system, and environmental conditions;

Step 2: determining a water flow rate range heated by a solar heat collection unit according to a heat transfer oil working temperature range and an equipment safely working range of the solar heat collection unit; and then, according to a ratio of the water flow rate range to a feedwater flow rate of the coal-fired power generation system, determining a solar-coal feedwater flow distribution ratio range applicable by the solar-aided coal-fired power system;

Step 3: under a condition of the set power load and a condition which keeps the main steam flow rate, the main steam temperature and the reheat steam temperature of the steam turbine of the solar-aided coal-fired power system unchanged, within the solar-coal feedwater flow distribution ratio range calculated in the Step 2, establishing a correspondence between the generated power and the solar-coal feedwater flow distribution ratio of the solar-aided coal-fired power system under current solar irradiance condition and the power load;

Step 4: selecting a solar-coal feedwater flow distribution ratio corresponding to a maximum generated power under the required operating conditions according to the correspondence obtained in the Step 3, wherein a design solar irradiance is an average direct normal solar irradiance in a typical meteorological year at the operating location of the solar-aided coal-fired power system; when operating at 80% to 100% power load, controlling the solar-coal feedwater flow distribution ratio at a lower limit; when operating at 60% to 80% power load, and when the direct normal solar irradiance is greater than 78%-95% of the design solar irradiance, controlling the solar-coal feedwater flow distribution ratio between 0.4 and 0.7 to obtain a maximum value of the generated power, and when the solar direct normal irradiance is lower than 78%-95% of the design solar irradiance, controlling the solar-coal feedwater flow distribution ratio between the lower limit and 0.6 to obtain the maximum value of the generated power; when operating at 40% to 60% power load, and when the direct normal solar irradiance is greater than 94%-102% of the design solar irradiance, controlling the solar-coal feedwater flow distribution ratio at an upper limit to obtain the maximum value of the generated power, and when the direct normal solar irradiance is between 47%-63% and 94%-102% of the design solar irradiance, controlling the solar-coal feedwater flow distribution ratio between 0.4 and 0.7 to obtain the maximum value of the generated power, and when the direct normal solar irradiance is lower than 47%-63% of the design solar irradiance, controlling the solar-coal feedwater flow distribution ratio between 0.25 and 0.3 to obtain the maximum value of the generated power, wherein the generated power is close to the maximum value when the solar-coal feedwater flow distribution ratio is controlled between 0.3 and 0.8; and Step 5: according to an optimized solar-coal feedwater flow distribution ratio obtained in the Step 4, calculating an optimized value $D_{wTCS}$ of the water flow rate heated by the solar heat collection system with a formula (3), and adjusting the water flow rate heated by the solar heat collection system to the optimized value;

$$D^*_{wTCS} = \alpha^*_{TCS} \cdot D_w \tag{3}$$

wherein $D^*_{wTCS}$ is the optimized value of the water flow rate entering the solar heat collection system for heating, kg/s; $\alpha^*_{TCS}$ is the optimized solar-coal feedwater flow distribution ratio; $D_w$ is a feedwater flow under current working conditions, kg/s;

when the operating conditions of the solar-aided coal-fired power system or solar irradiance changes, repeating Steps 1 to 5 again to reach the control goal.

Preferably, in the Step 1, the relevant information of the environmental conditions comprises a current solar irradiance and an ambient temperature; the relevant information of the solar heat collection system comprises information of the solar heat collection unit and a mirror field; the relevant information of the coal-fired power generation system is information required for generated power calculation, comprising a main steam parameter, steam turbine extraction parameters, and operation information of the high-pressure heaters and low-pressure heaters.

Preferably, the solar heat collection system of the solar-aided coal-fired power system is also connected in parallel to a second-stage high-pressure heater and a third-stage high-pressure heater.

Figure 2:
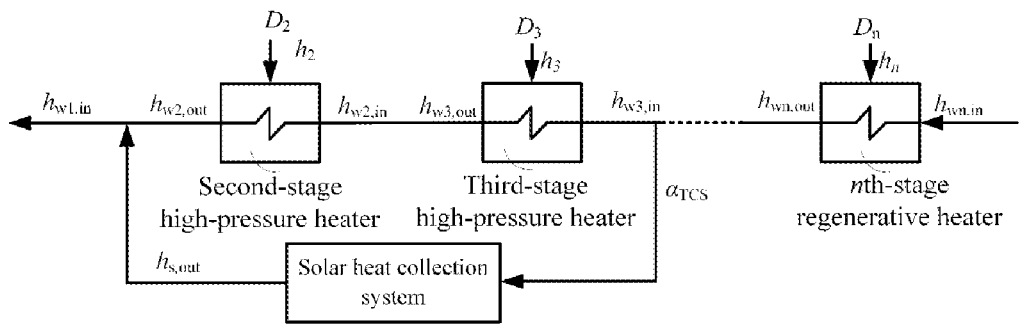
FIG. 2 is a schematic diagram of regenerative heater connection in an implementation system of the control method for optimizing the generated power of the solar-aided coal-fired power system under the off-design working conditions according to the present invention.

Referring to the embodiment as shown in FIG. 2, in the solar-aided coal-fired power system, the solar heat collection system is connected in parallel with the second-stage high-pressure heater and the third-stage high-pressure heater. Main parameters and main environmental information are shown in Table 1.

TABLE 1 main parameters and main environmental information of solar-aided coal-fired power system

| Parameter | Value | Unit |
| --- | --- | --- |
| Rated power of the coal-fired power system | 600 | MW |
| Main steam flow rate | 469.81 | kg/s |
| Main steam temperature | 566.0 | ° C. |
| Main steam pressure | 24.2000 | MPa |
| Reheat steam flow rate | 387.52 | kg/s |
| Reheated steam temperature | 566.0 | ° C. |
| Reheat steam pressure | 3.6110 | MPa |
| Outlet temperature with heat transfer oil | 350.0 | ° C. |
| Solar heat collection area | 134138 | m² |
| Design solar irradiance | 638 | W/m² |
| Ambient temperature | 20 | ° C. |

Figure 3:
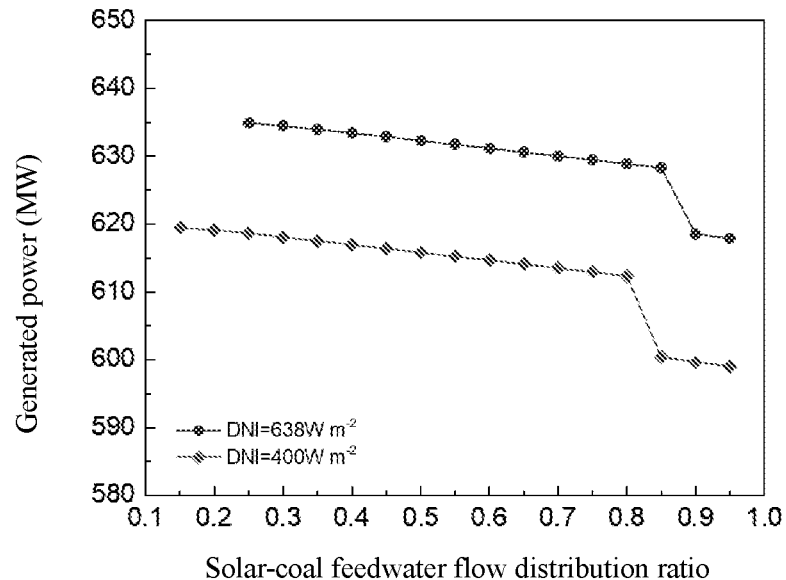
FIG. 3 illustrates a correspondence between 100% THA power load and a solar-coal feedwater flow distribution ratio according to an embodiment of the control method for optimizing the generated power of the solar-aided coal-fired power system under the off-design working conditions according to the present invention.
Figure 4:
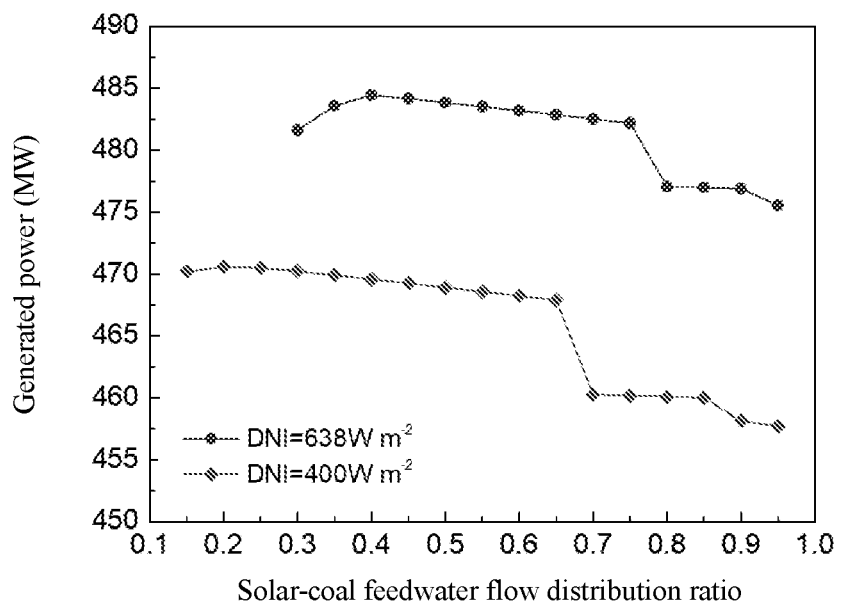
FIG. 4 illustrates a correspondence between 75% THA power load and the solar-coal feedwater flow distribution ratio according to the embodiment of the control method for optimizing the generated power of the solar-aided coal-fired power system under the off-design working conditions according to the present invention.
Figure 5:
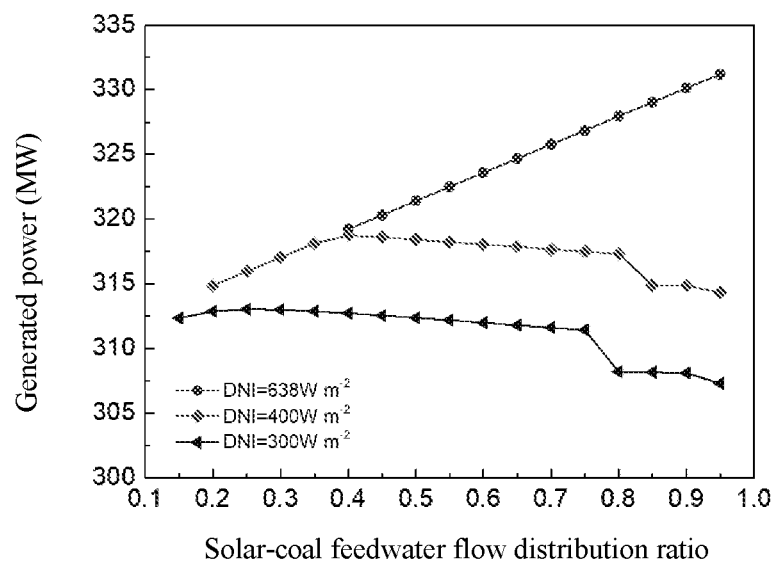
FIG. 5 illustrates a correspondence between 50% THA power load and the solar-coal feedwater flow distribution ratio according to the embodiment of the control method for optimizing the generated power of the solar-aided coal-fired power system under the off-design working conditions according to the present invention.

According to the solar-aided coal-fired power system shown in the embodiment, the correspondence between the total generated power of the solar-aided coal-fired power system and the solar-coal feedwater flow distribution ratio varies under different working conditions, and is related to the solar irradiance even under the same power load working requirements. When the solar-aided coal-fired power system in the embodiment is operated at 80% to 100% power load, taking 100% power load as an example, as shown in FIG. 3, the correspondence between the generated power and the solar-coal feedwater flow distribution ratio is monotonically decreasing. When the system in the embodiment is operated at 60% to 80% power load, taking 75% power load as an example, as shown in FIG. 4, the correspondence between the generated power and the solar-coal feedwater flow distribution ratio is first increasing and then gradually decreasing when the direct normal solar irradiance is greater than 78%-95% of the design solar irradiance. When the system in the embodiment is operated at 40% to 60% power load, taking 50% power load as an example, as shown in FIG. 5, the correspondence between the generated power and the solar-coal feedwater flow distribution ratio is linearly increasing when the direct normal solar irradiance is greater than 94%-102% of the design solar irradiance, the correspondence is first increasing and then gradually decreasing when the direct normal solar irradiance is between 47%-63% and 94%-102% of the design solar irradiance, and the correspondence between the generated power and the solar-coal feedwater flow distribution ratio is first increasing and then gradually decreasing with a lower increasing rate when the direct normal solar irradiance is lower than 47%-63% of the design solar irradiance.

According to research of the correspondence between the generated power and the solar-coal feedwater flow distribution ratio, it can be obtained that when operating at 80% to 100% power load, controlling the solar-coal feedwater flow distribution ratio at a lower limit; when operating at 60% to 80% power load, and when the direct normal solar irradiance is greater than 78%-95% of the design solar irradiance, controlling the solar-coal feedwater flow distribution ratio between 0.4 and 0.7 to obtain the maximum value of the generated power, and when the direct normal solar irradiance is lower than 78%-95% of the design solar irradiance, controlling the solar-coal feedwater flow distribution ratio between the lower limit and 0.6 to obtain the maximum value of the generated power; when operating at 40% to 60% power load, and when the direct normal solar irradiance is greater than 94%-102% of the design solar irradiance, controlling the solar-coal feedwater flow distribution ratio at an upper limit to obtain the maximum value of the generated power; when the direct normal solar irradiance is between 47%-63% and 94%-102% of the design solar irradiance, controlling the solar-coal feedwater flow distribution ratio between 0.4 and 0.7 to obtain the maximum value of the generated power, and when the direct normal solar irradiance is lower than 47%-63% of the design solar irradiance, controlling the solar-coal feedwater flow distribution ratio between 0.25 and 0.3 to obtain the maximum value of the power generation, wherein the power generation is close to the maximum value when the solar-coal feedwater flow distribution ratio is controlled between 0.3 and 0.8.

The present invention provides an adjustment scheme for the solar-coal feedwater flow distribution ratio, which controls the feedwater flow rate entering the solar heat collection system to increase the generated power of the solar-aided coal-fired power system while the main steam flow rate and temperature remain unchanged, so as to provide a clear guidance for optimizing generated power under off-design operating conditions.

What is claimed is:

1. A control method for optimizing generated power of a solar-aided coal-fired power system under off-design working conditions, comprising steps of:

setting maximizing the generated power as an optimal control goal; and maximizing the generated power referring that under conditions of keeping a main steam flow rate, a main steam temperature and a reheat steam temperature of a steam turbine of the solar-aided coal-fired power system unchanged, adjusting a solar-coal feedwater flow distribution ratio of a solar-coal complementary loop to adjust a water flow rate heated in a solar heat collection system, thereby maximizing an output power of the steam turbine;

wherein the generated power is obtained by using a formula (1) to calculate a specific enthalpy of water heated by the solar heat collection system and water heated by a high-pressure heater after being mixed, and then by using formula (2) and combining a calculation method for a thermal system under off-design conditions to calculate the generated power;

$$h_{w(i-1),in} = \alpha_{TCS} \times h_{s,out} + (1-\alpha_{TCS}) h_{wi,out} \quad (1)$$

wherein $h_{w(i-1),in}$ is the specific enthalpy of the water heated by the solar heat collection system and heated by the high-pressure heater after being mixed, i=1, 2, . . . , n, kJ/kg; n is a total number of regenerative heaters in the solar-aided coal-fired power system, and the regenerative heaters are numbered from 1 to n in an order of high pressure to low pressure; $\alpha_{TCS}$ is the solar-coal feedwater flow distribution ratio; $h_{s,out}$ is a specific enthalpy of the water heated by the solar heat collection system, kJ/kg; $h_{wi,out}$ is a specific enthalpy of the water heated by the high-pressure heater, kJ/kg;

$$W_{SCPP} = D_0 h_0 + D_{zr} h_{zr} - \sum_{i=1}^{n} D_i h_{wi,in} - D_c h_c - D_{sg1} h_{sg1} - D_{sg2} h_{sg2} \quad (2)$$

wherein $D_0$ is the main steam flow rate of the solar-aided coal-fired power system, kg/s; $h_0$ is a specific enthalpy of main steam of the solar-aided coal-fired power system, kJ/kg; $D_{zr}$ is a reheat steam flow rate of the solar-aided coal-fired power system, kg/s; $h_{zr}$ is a specific enthalpy of reheat steam of the solar-aided coal-fired power system, kJ/kg; $D_i$ is an i-th stage extraction steam flow rate of the steam turbine of a coal-fired power generation system in the solar-aided coal-fired power system, kg/s; $h_{wi,in}$ is a specific enthalpy of an i-th stage extraction steam of the steam turbine of the coal-fired power generation system in the solar-aided coal-fired power system, kJ/kg; $D_c$ is an exhaust steam flow rate of the solar-aided coal-fired power system, kg/s; $h_c$ is a specific enthalpy of exhaust steam of the solar-aided coal-fired power system, kJ/kg; $D_{sg1}$ and $D_{sg2}$ are a front shaft seal steam flow rate and a rear shaft seal steam flow rate of the coal-fired power generation system in the solar-aided coal-fired power system, kg/s; $h_{sg1}$ and $h_{sg2}$ are specific enthalpies of front shaft seal steam and rear shaft seal steam of the coal-fired power generation system in the solar-aided coal-fired power system, kJ/kg;

the control method for optimizing the generated power comprises specific steps of:

Step 1: obtaining operating conditions required by the solar-aided coal-fired power system, and obtaining relevant information of the solar heat collection system connected in parallel with high-pressure heaters, the coal-fired power generation system, and environmental conditions;

Step 2: determining a water flow rate range heated by a solar heat collection unit according to a heat transfer oil working temperature range and an equipment safe working range of the solar heat collection unit; and then, according to a ratio of the water flow rate range to a feedwater flow rate of the coal-fired power generation system, determining a solar-coal feedwater flow distribution ratio range applicable by the solar-aided coal-fired power system;

Step 3: under a condition of the set power load and a condition which keeps the main steam flow rate, the main steam temperature and the reheat steam temperature of the steam turbine of the solar-aided coal-fired power system unchanged, within the solar-coal feedwater flow distribution ratio range calculated in the Step 2, establishing a correspondence between the generated power and the solar-coal feedwater flow distribution ratio of the solar-aided coal-fired power system under current solar irradiance condition and the power load;

Step 4: selecting a solar-coal feedwater flow distribution ratio corresponding to a maximum generated power under the required operating conditions according to the correspondence obtained in the Step 3, wherein a design solar irradiance is an average direct normal solar irradiance in a typical meteorological year at the operating location of the solar-aided coal-fired power system; when operating at 80% to 100% power load, controlling the solar-coal feedwater flow distribution ratio at a lower limit;

when operating at 60% to 80% power load, and when the direct normal solar irradiance is greater than 78% of the design solar irradiance, controlling the solar-coal feedwater flow distribution ratio between 0.4 and 0.7 to obtain a maximum value of the generated power, and when the solar direct normal irradiance is lower than 78% of the design solar irradiance, controlling the solar-coal feedwater flow distribution ratio between the lower limit and 0.6 to obtain the maximum value of the generated power; when operating at 40% to 60% power load, and when the direct normal solar irradiance is greater than 94% of the design solar irradiance, controlling the solar-coal feedwater flow distribution ratio at an upper limit to obtain the maximum value of the generated power, and when the direct normal solar irradiance is between 47% and 94% of the design solar irradiance, controlling the solar-coal feedwater flow distribution ratio between 0.4 and 0.7 to obtain the maximum value of the generated power, and when the direct normal solar irradiance is lower than 47% of the design solar irradiance, controlling the solar-coal feedwater flow distribution ratio between 0.25 and 0.3 to obtain the maximum value of the generated power, wherein the generated power is close to the maximum value when the solar-coal feedwater flow distribution ratio is controlled between 0.3 and 0.8; and Step 5: according to an optimized solar-coal feedwater flow distribution ratio obtained in the Step 4, calculating an optimized value $D^*_{wTCS}$ of the water flow heated by the solar heat collection system with a formula (3), and adjusting the water flow rate heated by the solar heat collection system to the optimized value;

$$D^*_{wTCS} = \alpha^*_{TCS} \cdot D \quad (3)$$

wherein $D^*_{wTCS}$ is the optimized value of the water flow rate entering the solar heat collection system for heating, kg/s; $\alpha^*_{TCS}$ is the optimized solar-coal feedwater flow distribution ratio; $D_w$ is a feedwater flow under current working conditions, kg/s;

when the operating conditions of the solar-aided coal-fired power system or solar irradiance changes, repeating Steps 1 to 5 again to reach the control goal.

2. The control method for optimizing generated power of a solar-aided coal-fired power system under off-design working conditions, as recited in claim 1, wherein in the Step 1, the relevant information of the environmental conditions comprises a current solar irradiance and an ambient temperature; the relevant information of the solar heat collection system comprises information of the solar heat collection unit and a mirror field; the relevant information of the coal-fired power generation system is information required for generated power calculation, comprising main steam parameters, steam turbine extraction parameters, and operation information of the high-pressure heaters and low-pressure heaters.

3. The control method for optimizing generated power of a solar-aided coal-fired power system under off-design working conditions, as recited in claim 1, wherein the solar heat collection system of the solar-aided coal-fired power system is also connected in parallel with a second-stage high-pressure heater and a third-stage high-pressure heater.

* * * * *